United States Patent [19]

Tsai

[11] Patent Number: 4,980,919

[45] Date of Patent: Dec. 25, 1990

[54] MESSAGE CARD TYPE OF LANGUAGE PRACTISING SET FOR CHILDREN

[76] Inventor: Yu-Ching Tsai, No. 14, Alley 21, Lane 22, Sec. 3 Jong-Ching Rd., Da-Yea Hsiang, Taichung, Taiwan

[21] Appl. No.: 16,188

[22] Filed: Feb. 17, 1987

[51] Int. Cl.⁵ .................................. G09B 7/02
[52] U.S. Cl. ...................... 381/51; 434/335; 434/169
[58] Field of Search ............... 381/51; 434/169, 185

[56] References Cited

U.S. PATENT DOCUMENTS

| | | | |
|---|---|---|---|
| 4,358,278 | 11/1982 | Goldfarb | 434/169 |
| 4,403,966 | 9/1983 | Yang | 434/169 |
| 4,459,674 | 7/1984 | Sakuri | 381/51 |
| 4,505,682 | 3/1985 | Thompson | 434/169 |

FOREIGN PATENT DOCUMENTS

| | | | |
|---|---|---|---|
| 2547094 | 12/1984 | France | 381/51 |
| 8995 | 1/1982 | Japan | 381/51 |

*Primary Examiner*—Bernard Roskoski
*Attorney, Agent, or Firm*—Asian Pacific International Patent and Trademark Office

[57] ABSTRACT

A language practising set, which can, under recording state, store voice signals, by means of a voice synthesizer, into a memory with different addresses through different coding holes on each of the message cards. Upon under replaying state, the various coding holes on the message cards can be decoded to have the voice signal stored in various memory addresses selected and replayed through the voice synthesizer.

1 Claim, 5 Drawing Sheets

MESSAGE CARD TYPE OF LANGUAGE PRACTISING SET FOR CHILDREN

BACKGROUND OF THE INVENTION

The conventional language practising set usually has two cassette tapes, i.e., a master tape and a secondary tape. When practising a language or singing, speech or song is to be played with the master tape. When a given section of the language or song is necessary to be replayed, push down the pause key to let the secondary tape play that section of language recorded for 20 seconds (The time length is subject to the cyclic tape, and generally there are two types of tapes, i.e., a ten second type and 20 second type.)

SUMMARY OF THE INVENTION

The present invention provides a language practising set, particularly a message card type of language practising set for children. The feature of this invention is that the pattern or picture on a card is interpreted into the equivalent voice meaning by a mother, and is recorded into the language practising set. When a child inserts one of the message cards into the language practising set, the voice equivalent to the meaning of the picture shown on the card will be played immediately to provide a combined voice-and-picture teaching result; in other words, the present invention can provide the children with a learning method to link the visual and linquistic education together. Furthermore, this invention can also serve as a message recorder.

DETAILED DESCRIPTION

The main object of this invention is to provide a language practising set designed for children in the age of learning to speak, to sing and to read pictures; it is a joyful learning method through the mother-and-son relation so as to achieve a combined visual and linguistic education at the same time.

It is another object of the present invention to serve as message recorder to record the message of phone-call visitor. Upon the family member coming home, he or she can hear the message by pressing down the message card to replay the message.

Still another object of this invention is to provide a language practising set, which can operate without recording tapes, and mechanical structures, and which is shock-proof and is easy to operate by children.

Figure 1:
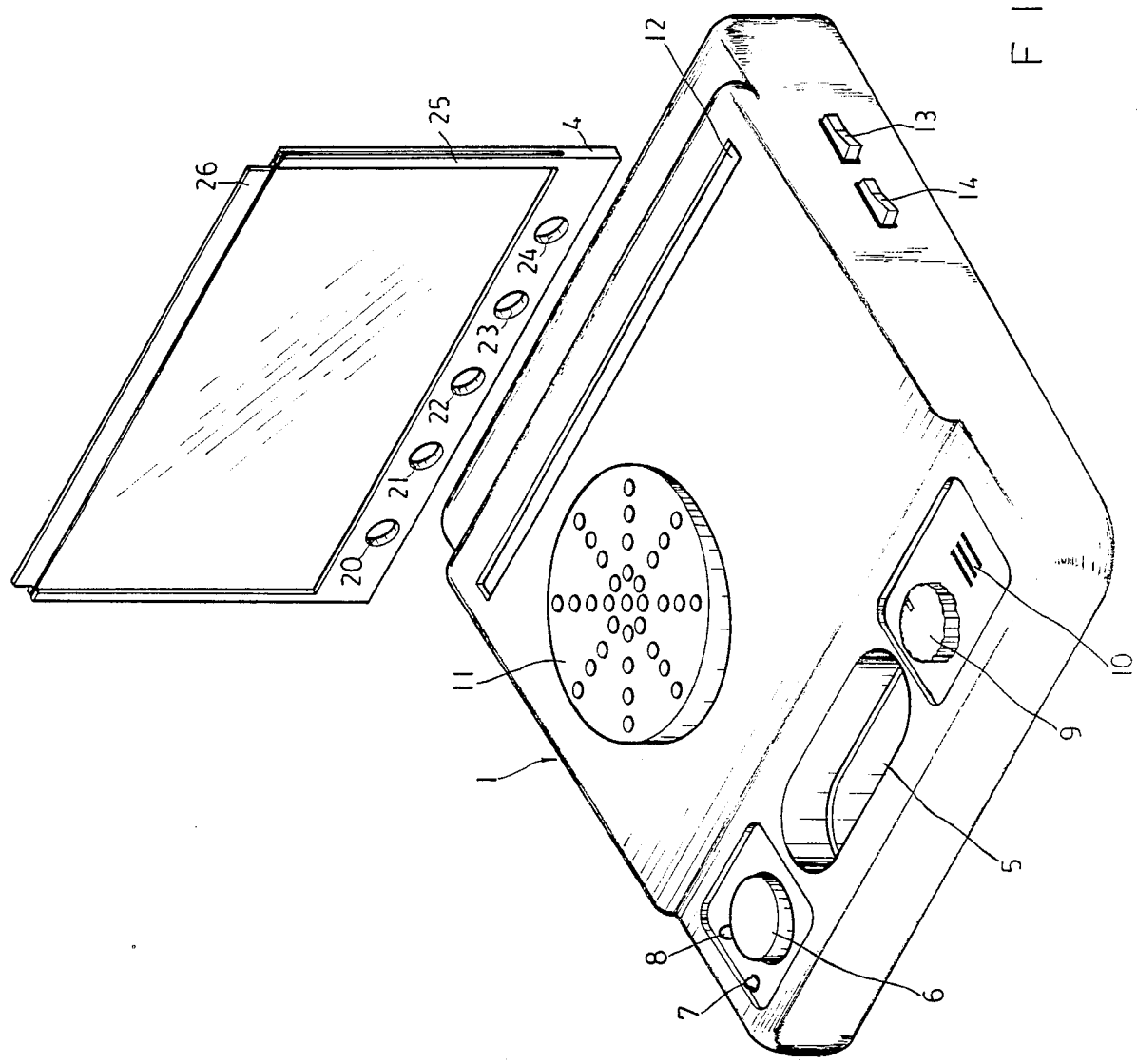
FIG. 1 is a perspective view of the embodiment of the present invention.

The structure and circuit of this invention are further described in detail, with reference to the drawings attached, as follows:

FIG. 1 is a perspective view of the present invention.

Figure 2:
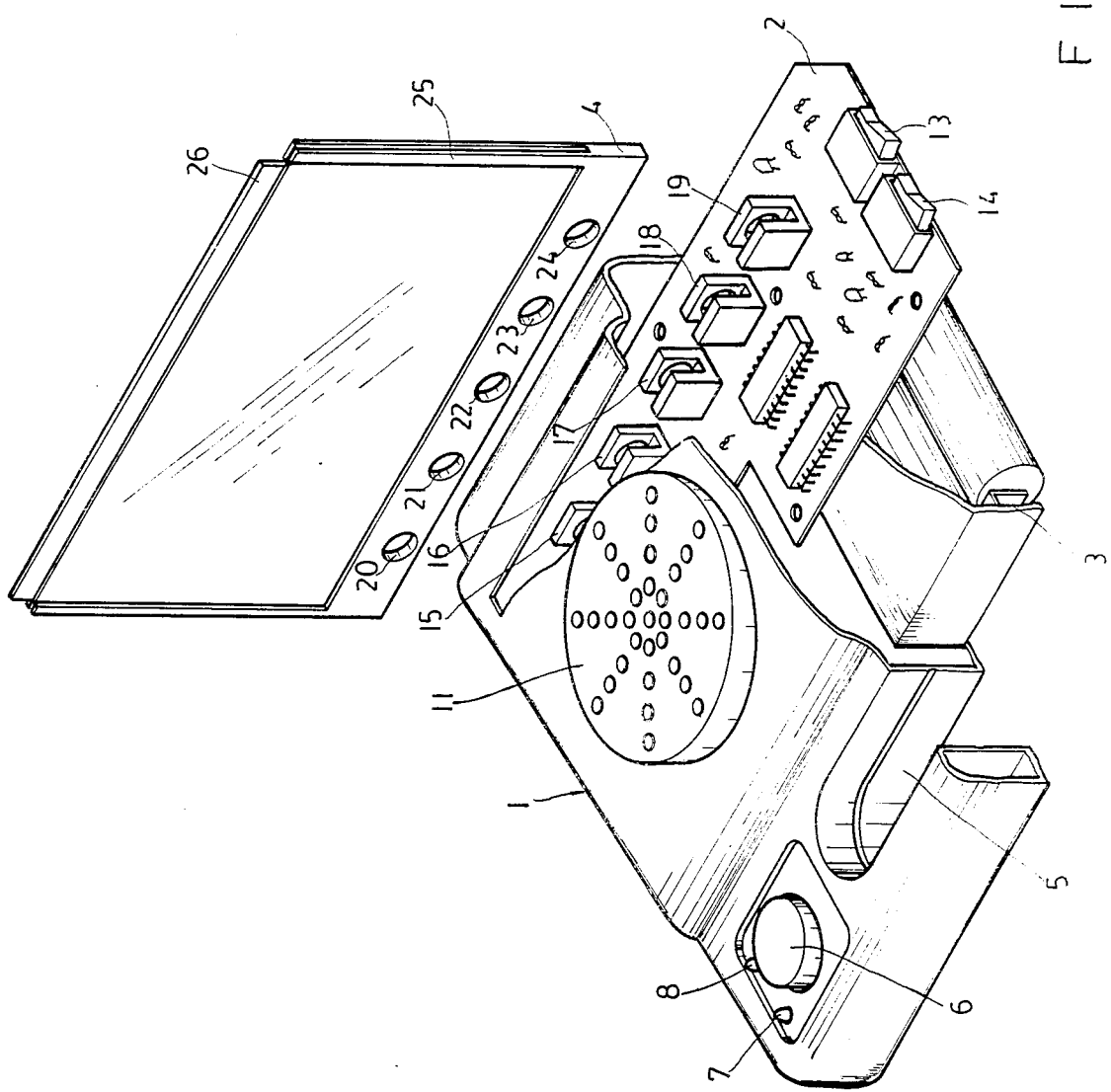
FIG. 2 is a fragmental sectional view of the FIG. 1 embodiment of the present invention.

FIG. 2 is fragmental sectional view of the present invention.

The present invention comprises an external casing 1, an electric circuit board 2, a battery holder 3 and a message card 4. The casing 1 is furnished with a handle 5 and a start button 6, a recording indicator LED (light emitting diode) 7 and a memory-full indicator LED 8 on the left side, and a volume knob 9 and microphone 10 on the right side. On the top face of the language practising set, there is a speaker 11 and a card slot 12 for message card 4. A power switch 13 and a record-reply switch 14 are furnished on the right side of the casing.

The electric circuit board 2, in addition to IC's and components, has five sensors located beneath the card slot 13 of the casing 1. Sensor 15 is used to detect the check hole 20 of message card 4; the sensors 16, 17, 18, 19 are used to decode the coding holes 21, 22, 23, 24 on the message card 4. There is also a U-shaped transparent slot 25 on the card 4 to hold pictures 26. The battery in holder 3 provides the operating power.

Figure 3:
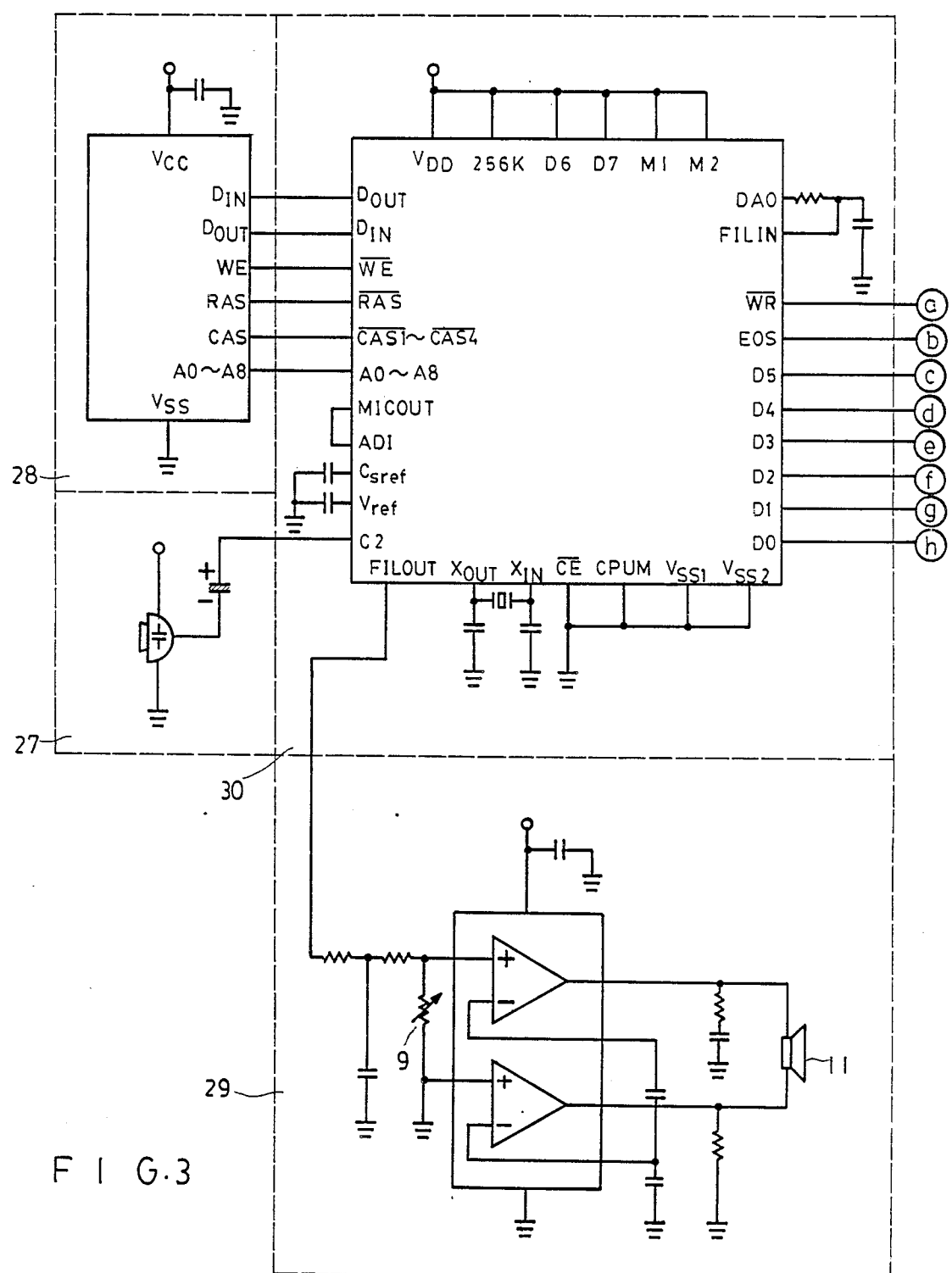
FIG. 3 is the schematic diagram of the circuit 1 of the present invention.
Figure 4:
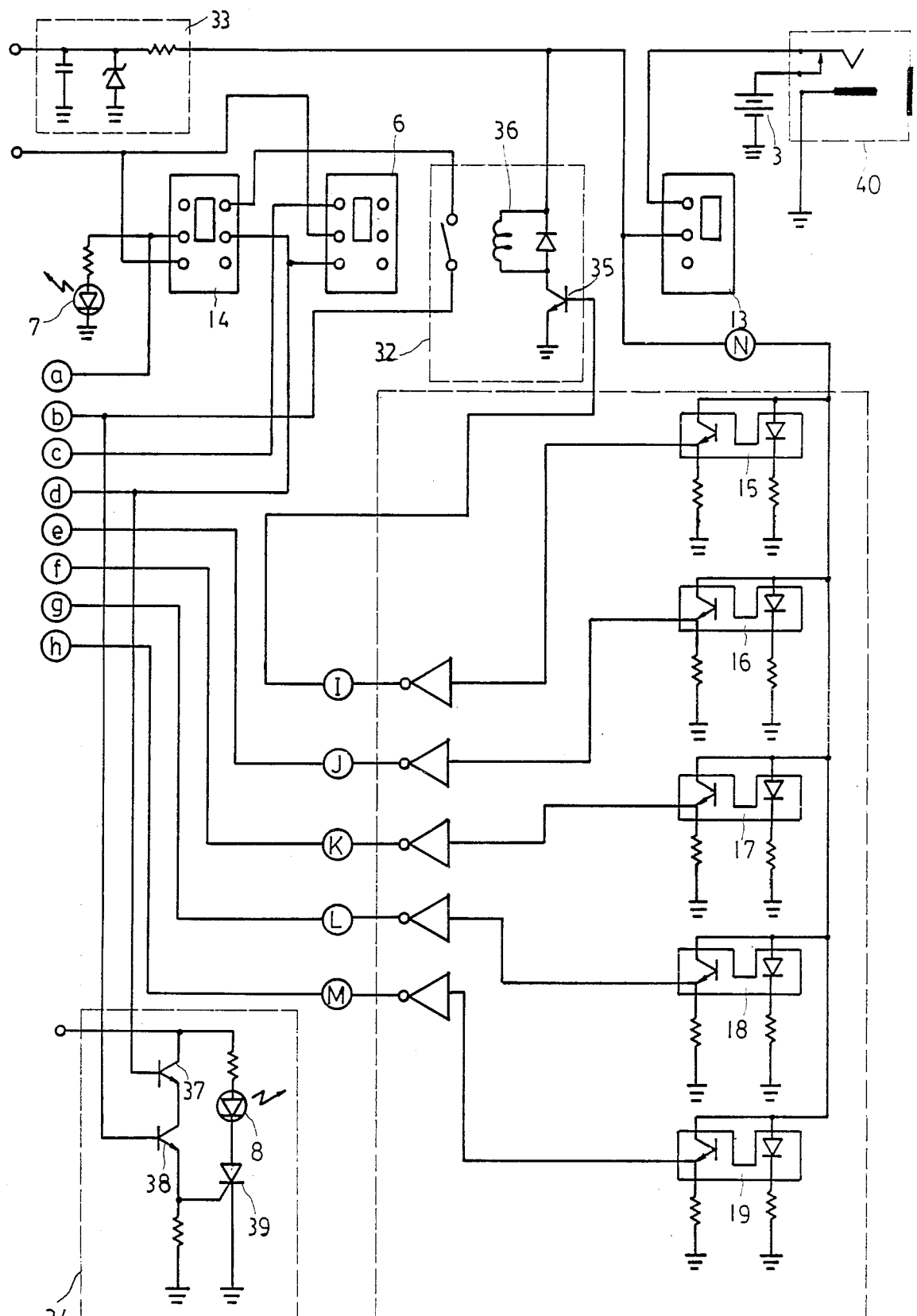
FIG. 4 is the schematic of the circuit 2 of the present invention.

FIG. 3 and FIG. 4 illustrate the whole circuit of the present invention, which includes a microphone 27, a memory 28, a power amplifier 29, a voice synthesizer 30, an input interface circuit 31, a control circuit 32, a voltage regulator circuit 33, and a memory-full indicating circuit 34.

The voice synthesizer, upon recording, stores the voice signals into memory 28; upon replaying, the voice synthesizer retrieves data from the memory, and transfer the data into analog data before being coupled to the power amplifier 29. The voice signals are also controlled by the input interface circuit 31, record-replay switch 14, and the start button 6.

Sensors 15, 16, 17, 18 and 19 detect the check hole 20 and the coding holes 21, 22, 23, 24 on the message card 4. The check signal sent out by input interface circuit 31 activates relay 36 through transister 35, and controls EOS signal from the voice synthesizer 30.

Figure 5:
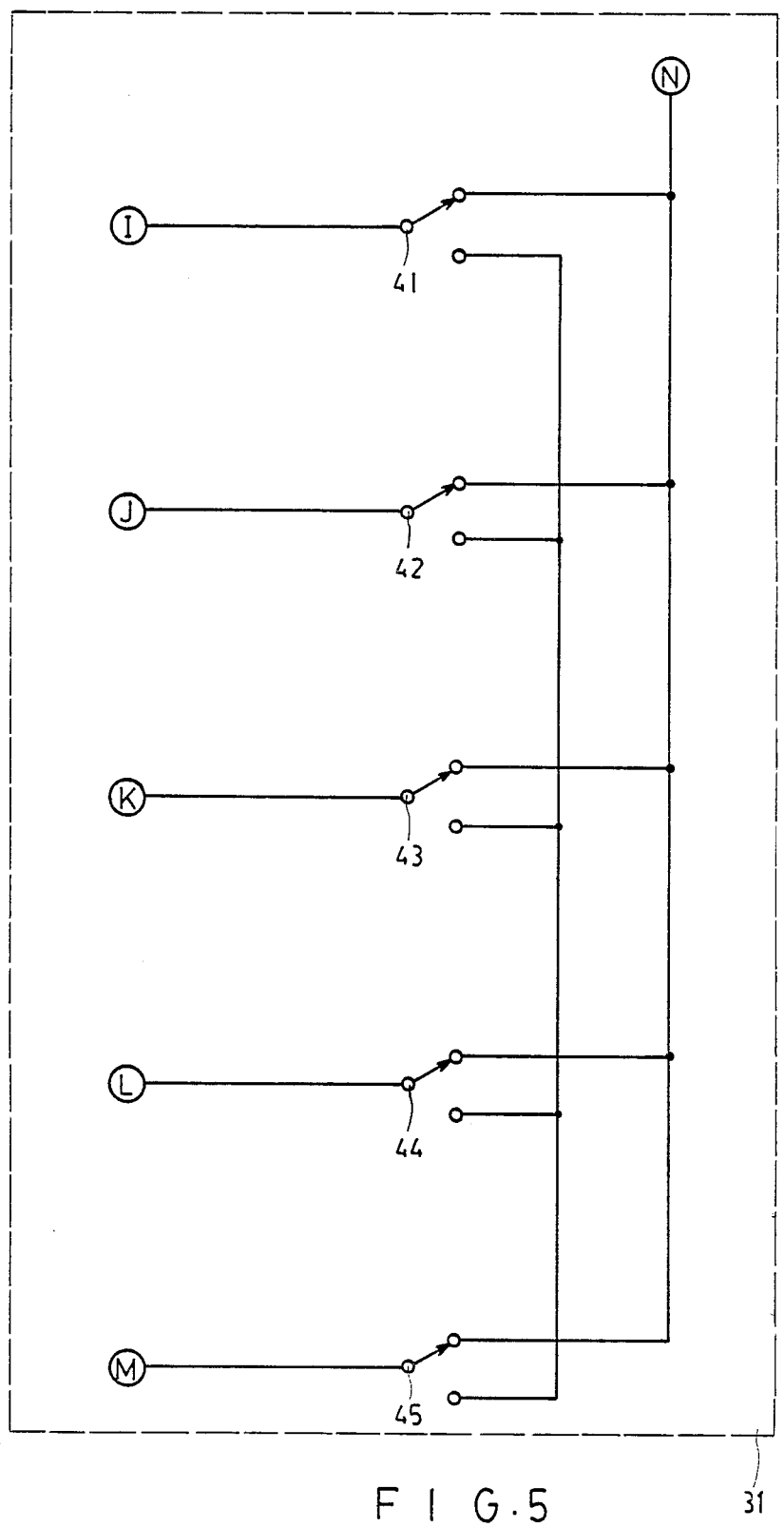
FIG. 5 illustrates another embodiment of the input interface circuit of the present invention.

When memory is full, transistor 37 is driven by the start button, and transistor 38 receives EOS signal from voice synthesizer 30. TR2 AND TR3 triggers silicon controlled rectifier, and then memory-full indicator LED 8 is turned on. Power can also be supplied with an external source through power plug 40. When the power switch 13 is turned on, the record-replay switch 14 is first set to record position; the recording indicator LED 7 lights up, indicating the voice synthesizer 30 being in recording state. The user inserts message card 4 into the card slot 12, i.e., to trigger the input interface circuit 31. When the start 6 is pushed down: then, the voice signals can be put through microphone 27, into the voice synthesizer, which stores the signal into memory according to the address of message card 4. The address takes 4 bits and provides 16 sectors to be chosen. To replay the voice or speech recorded, the user sets the record-replay switch 14 to replay position, and inserts the message card 4 back into the card slot. The control circuit 32 will detect the check and coding signals from the holes on the card. The voice signals are then repeatedly read from addressed memory by the voice synthesizer, and amplified by the power amplifier 29, and finally sent out through the speaker (11 FIG. 3). FIG. 5 illustrates another embodiment of the input interface circuit, in which switches SW1 41, SW2 42, SW3 43, SW4 44, SW5 45, serving the same function as the sensors described above, control the input interface circuit.

Briefly, this invention not only serves as an excellent tool for children linguistic education, but also can serve as a message recorder. Its compact design can meet the requirements of today's market.

I claim:

1. A message card type of language practicing set comprising:

- a microphone (27) operable to convert an audio signal into an electric signal;
- a memory (28);
- a voice synthesizer (30) electrically connected to said microphone and to said memory for receiving voice signals from the microphone and passing said signals into the memory;
- a power amplifier (29) electrically connected to said voice synthesizer such that said synthesizer is enabled to retrieve voice signals from the memory and send same to the power amplifier;
- a record-replay switch (14) having a record position and a replay position; said record-replay switch having a record connection (a) to the voice synthesizer;
- a start button (6) having a record connection (d) to the voice synthesizer and a replay connection (c) to the voice synthesizer;
- a message card (4) having a check hole and address holes on the lower end thereof, and slot (25) for holding pictures;
- an input interface circuit having sensors therein operable to detect signals the check hole and coding holes on the message card and to generate signals, and electrical connections between the coding hole sensors and the voice synthesizer for delivering said signals to the voice synthesizer;
- whereby when the record-replay switch is set at the record position the input interface circuit responds to the coding holes in the message card to enable the voice synthesizer to receive a signal from the microphone for storage in the memory, and
- whereby when the record-replay switch is set at the replay position the voice signal selected by the message card is regenerated from memory by the voice synthesizer, amplified by the power amplifier, and replayed through the speaker to achieve the goal of learning language through pictorial aid;
- a memory-full indicating circuit (34) that includes a first transistor (37) controlled by the start button when in its record position, and a second transistor controlled by the EOS signal (b) from the voice synthesizer, and an SCR triggered by the transistor outputs.

* * * * *